Patented May 1, 1951

2,551,056

UNITED STATES PATENT OFFICE 2,551,056

CHROME MONOAZO DYESTUFFS

Guido Schetty, Basel, Switzerland, assignor to J. R. Geigy A. G., Basel, Switzerland, a Swiss company No Drawing. Application September 7, 1948, Serial No. 48,151. In Switzerland September 19, 1947

7 Claims. (Cl. 260—147)

A great number of chromium containing azo dyestuffs suitable for dyeing wool in the acid dye-bath are known. They all have the characteristic that they contain groups giving rise to anions, particularly sulfonic acid groups. Upon this depends their solubility in water, which is essential if they are to be of use in textile-dyeing. They vary little from acid levelling-dyestuffs for wool in respect of chromium content, but quite considerably as regards application, since they only give even, full and fast dyeings on wool in a strongly acid, usually strongly mineral acid, dyebath. The usual dyeing method for chromium-containing azo dyestuffs consists in boiling the wool for several hours in a dyebath with 6–8% of sulfuric acid, calculated on the weight of wool. This considerably damages the wool fibres however, so that this method is not suitable for dyeing the finer qualities. According to G. L. Royer, H. E. Millson, and C. A. Amick (Journal of the Society of Dyers and Colourists, 63, 212–224 (1947)) damage to wool is least on boiling in water at acidities corresponding to the isoelectric point of the wool. Consequently a dyeing method which is to safeguard the fibres must use a bath which has only a weak acidity, ranging from that of acetic to that of formic acid, and dyestuffs are required, which give full and even dyeings under these conditions. While many non-chrome wool dyestuffs give satisfactory results in the weakly acid dyebath, most chromium-containing wool dyestuffs give only very uneven, weak and practically worthless dyeings with poor fastness properties by this method. However, since such dyestuffs have well known advantages, it would be a big technical advance if they could be used to dye wool under conditions non-injurious to the fibres. According to Ender and Müller (Melliands Textilberichte, 19, 181, 272 (1938)) the striking difference in the dyeing properties of azo dyestuffs containing chromium and sulfonic acid groups in the weakly acid and in the strongly acid dyebath arises because, during dyeing, the chromium atom as well as the sulfonic acid group becomes bound to the wool-protein. With increasing acidity of the dyebath, however, the affinity of the chromium atom for the wool-protein decreases, while that of the sulfonic acid groups increases, so that the nature of chromium-containing wool dyestuffs in the strongly mineral acid dyebath approaches that of the acid levelling dyestuffs, and even, fully developed dyeings are obtained. From this explanation it follows that complex chromium compounds of azo dyestuffs with no anionic groups cannot behave like acid levelling dyestuffs. Complex chromium compounds of monoazo dyestuffs which contain no ionic groups, such as carboxyl, sulfonic acid and amino groups, but contain substituents usual in azo dyestuffs, e. g., halogen, alkyl, alkoxy and nitro groups, have been repeatedly described in patent literature. As expected, they are insoluble in water and therefore of no direct use in the textile industry. As they are soluble in organic solvents, for example in lower alcohols, they are used for colouring varnishes.

The surprising discovery has now been made that monoazo dyestuffs of the general formula

$$[X-A-N=N-B]-(SO_2-CH_3)_n$$

wherein

A represents a benzene nucleus,
B represents the radical of a member selected from the group consisting of phenolic, naphtholic and enolic coupling components, coupling in o-position to the hydroxyl group,
X represents a metallizable group in o-position to the azo group with the condition that any further constituents carried by A and B must be non-ionising, and
$n$ is one of the integers 1 and 2, the methylsulfone group being bound aromatically, can be converted by chroming methods known per se into water-soluble chromium complexes which dye wool in very even full and fast shades from the weakly acid bath.

The chromable monoazo dyestuffs according to the invention are thus characterised by the presence of one or two aromatically bound methylsulfone groups and by the absence of the acid, salt-forming groups containing sulphur or carbon (so far as the carboxyl group is not used in metal-complex formation) usual in chromable monoazo dyestuffs. The characteristic methylsulfone group can not be replaced in the monoazo dyestuffs used according to the invention by another non-ionising negative group introduced in the same position, e. g., the nitro group, without to a large extent losing the valuable properties of the chromium-containing final product. As far as is known, the methylsulfone group has not previously been used as a substituent in o:o'-dihydroxyazo, or o-hydroxy-o'-carboxy chrome azo dyestuffs, at least not in o:o'-dihydroxy or o-hydroxy-o'-carboxy monoazo chrome dyestuffs. This becomes understandable, when it is realised that the corresponding chromium-free monoazo dyestuffs when after-chromed on wool give dyeings with only moderate fastness properties when wet.

It is all the more surprising that the new complex chromium compounds give dyeings on wool having good wet-fastness properties, especially bearing in mind the opinion of Ender and Müller (loc. cit.) according to which sulfonic acid groups are necessary for binding the dyestuff to the wool proteins.

The new chromium-complex dyestuffs are excellently suited for dyeing wool from a weakly acid, for example, 2% acetic or up to 4% formic acid dyebath (the percent acid is calculated on the weight of material to be dyed) since they are readily soluble in water and do not precipitate even from a weakly acid aqueous medium. Naturally, the additives usual in wool-dyeing can be added to the dyebath, such as sodium sulfate, ammonium sulfate, sodium pyrophosphate or condensation products of fatty alcohols with ethylene oxide, guanamine sulfonic acids with high molecular alkyl radicals and the like. The new products draw well on wool, level well and yield fully developed, very even shades. Another important property is that they dye mixtures of loose wools of different origins very uniformly. Thick piece-goods are generally very well penetrated, an advantage which made the brownish chromium complex dyestuffs containing sulfonic acid groups so valuable in spite of the damage done to the wool.

The monoazo dyestuffs serving as starting material for the present invention are obtained from methylsulfone substituted diazo or coupling components, i. e., the methylsulfone group can be either in the diazo or in the coupling component or in both, their maximum permissible number being two, however. As further substituents not taking part in the metallising process may be named: halogen, alkyl, alkoxy, acylamino, nitro, carboxylic acid-amido groups and the like.

Methylsulfone substituted dyestuff components are obtained by known methods by methylating the corresponding sulfinic acids, e. g., with dimethyl sulfate, or by oxidising methylthiophenyl ether, e. g., with hydrogen peroxide. Thus the valuable methylsulfonyl-o-amino-phenols of the present invention may be prepared from o-nitrochlorobenzenesulfonyl chlorides by first mildly reducing with sodium sulfite to the corresponding sulfinic acids, methylating these, then replacing the chlorine atom by the hydroxyl group with caustic alkali and next converting the nitro group to the amino group, for example, by reduction with sodium sulfide. Ortho-alkoxy compounds are obtained analogously through the reaction of the chlorine atom with alcoholates. Ortho-carboxy compounds are derived from o-nitro-methylmethylsulfonyl benzenes by oxidation with permanganate and the like. The following further examples of such compounds may be named: 1-hydroxy-, 1-methoxy-, 1-ethoxy-, 1-chloro-, 1-bromo-, and 1-carboxy-2-amino-4-methylsulfonyl-benzene, 1-hydroxy-2-amino-4-methylsulfonyl-6-chlorobenzene, 4-chloro-2-amino-1-hydroxy-6-methylsulfonylbenzene, 4-nitro-2-amino-1-hydroxy-6-methylsulfonyl-benzene, 2-amino-1-hydroxy-4:6-di-(methylsulfonyl)-benzene. Methylsulfone substituted coupling components are obtainable, for example, from methylsulfonylaminobenzenes by condensing these with diketene or β-keto-carboxylic acid esters to form the corresponding aceto-acetic acid anilides, by converting the amino group by known methods to the hydrazino group and condensing with β-keto-carboxylic acid esters to form 1-aryl-5-pyrazolones, or from the O-acylsulfonyl compounds of the naphtholsulfonic acids via the sulfonyl chloride and sulfinic acids by methylation followed by saponification of the O-acyl group. Particularly suitable coupling components are 1-hydroxy-5-methylsulfonylnaphthalene, 2-hydroxy-6-methylsulfonyl-naphthalene, 1-(3'-methylsulfonylphenyl)-3-methyl-5-pyrazolone, 1-(4'-methylsulfonylphenyl)-3-methyl-5-pyrazolone. Apart from the diazo and coupling components named, which are partly new, naturally there may also be employed the diazo and coupling components free of sulfonic acid groups and with a single carboxyl group in ortho-position to the diazo group as used up till now in chrome dyestuffs, i. e., especially o-aminophenols and aceto-acetic acid arylides, pyrazolones, hydroxyquinolines, phenols and naphthols which may all contain further non-ionising substituents. Monazo dyestuffs derived from diazotised monomethylsulfonyl-o-aminophenols and compounds of the benzene, naphthalene and pyrazolone series coupling in the neighbouring position to the hydroxyl group and containing no or only one methylsulfone group are very suitable for the new processes.

Particularly valuable are dyestuffs produced from diazotised di-(methylsulfonyl)-o-aminophenols and the coupling components without a methylsulfonyl group mentioned. In contrast to o:o'-dihydroxyazo- and o-hydroxy-o'-carboxyazo dyestuffs, the o-amino-o'-hydroxyazo dyestuffs containing methylsulfonyl groups give only unusable, difficultly soluble chromium compounds. The complex chromium compounds of the o-hydroxy-o'-carboxyazo dyestuffs according to the invention are in general somewhat less fast under wet conditions than those of the o:o'-dihydroxyazo dyestuffs.

As examples of o:o'-disubstituted azo dyestuffs, which can be converted into o:o'-dihydroxy- or o-hydroxy-o'-carboxy azo dyestuffs under the conditions of the chroming reaction may be mentioned: o-chloro-, o-bromo-, o-methoxy-, o-ethoxy-, o-carbomethoxy-, o-carbethoxy-, o-(p'-toluenesulfonyl-hydroxy)-, o-carboxylic acid-methyl ester- and o-carboxylic acid-ethyl ester-o'-hydroxy azo dyestuffs.

The monoazo dyestuffs serving as starting material for the present manufacture can be converted into water-soluble chromium compounds by known chroming methods. Particularly suitable are those chroming methods employing an alkaline aqueous medium, for example, those using glycerol-alkali chromite. Another chroming method excellently adapted for the present manufacture is that carried out in a practically neutral medium with complex chromium compounds of o-hydroxy-carboxylic acids of the benzene series (U. S. P. 2,417,735). Chroming can be effected at a raised temperature in either an open or a closed vessel. Chroming with trivalent chromium salts is best carried out in organic solvents, for example, in lower alcohols. After the conversion has taken place, alkaline reaction must be ensured or the reaction product must be digested with an alkali lye or with substances with an alkaline reaction, for example, soda, sodium phosphate or sodium pyrophosphate.

A process for dyeing animals fibres with complex chromium compounds of o:o-dihydroxy azo dyestuffs containing no sulfonic acid and sulfamide groups is already known. According to it the water-insoluble complex chromium compounds are applied in the form of a suspension in a neutral to weakly alkaline medium. In contrast, the process of the present invention uses the conventional method of dyeing wool from an aqueous solution and an acid bath. Furthermore, the new dyestuffs according to the invention are distinguished by much better levelling power.

Finally, a process for the manufacture of water-soluble, chromium-containing dyestuffs by chroming chrome dyestuffs free from sulfonic acid groups has been described (U. S. P. 2,417,735), including the chroming of dyestuffs from diazotised 4-nitro-2-aminophenol and 1-phenyl-3-methyl-5-pyrazolone with complex chromium compounds of aromatic o-hydroxycarboxylic acids. However, this chroming reaction as can be seen from the patent specification in question, does not proceed uniformly, since not inconsiderable quantities of water insoluble by-products are formed. In addition, this special chroming process is fairly expensive because of the use of complex chromium compounds of aromatic o-hydroxy-carboxylic acids containing sulfonic acid groups. In contrast, by chroming the dyestuffs originally defined herein complex chromium compounds which are usable in their entirety for wool-dyeing are obtained, i. e., a considerably better yield of dyestuff; furthermore, cheaper methods of chroming can be used.

The new dyestuffs are suitable not only for the dyeing of wool but also for dyeing synthetic fibres analogous to wool from super-polyamides and super-polyurethanes, casein fibres, etc. They are also suitable for dyeing silk and leather, especially glacé leather.

The following examples illustrate the invention, without limiting it. The parts are by weight, unless otherwise stated, and the temperatures are in degrees centigrade. The relationship of parts by weight to parts by volume is that of kilograms to litres.

*Example 1*

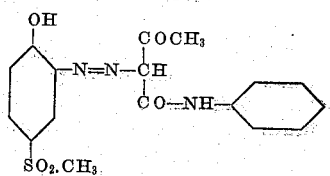

18.7 parts of 2-amino-1-hydroxybenzene-4-methylsulfone are dissolved in 150 parts of hot water with 17 parts of concentrated hydrochloric acid, cooled to 5° and diazotised with a solution of sodium nitrite (corresponding to 6.9 parts). The diazonium compound partly precipitates as clay coloured crystals. The reaction mixture is made neutral by adding sodium bicarbonate and the suspension poured into a solution of 18.1 parts of the anilide of aceto-acetic acid, 10.5 parts by volume of 10 N caustic soda lye and 12 parts of anhydrous soda in 100 parts of water. After the dyestuff has formed it is isolated at 70° by adding common salt and chromed, after dissolving in 600 parts of hot water, by heating with 200 parts of a solution of ammonium chromo-salicylate (corresponding to 7.6 parts of chromic oxide) at the boiling point until complex-formation is finished, which takes about 30 minutes. The chromed dyestuff is isolated with common salt. After drying, it is a brownish-yellow powder which dyes wool and silk from the acid bath in very fast, even golden-yellow shades.

2-amino-1-hydroxybenzene - 4 - methylsulfone can be made as follows: 1 mol of 1-chloro-2-nitrobenzene-4-methylsulfone (Brit. Pat. 467,549) is stirred with 2 mols of dilute caustic soda lye for a few hours at the boiling point. The 2-nitro-1-hydroxybenzene-4-methylsulfone is then reduced by the usual methods, e. g., by heating with sodium sulfide solution.

*Example 2*

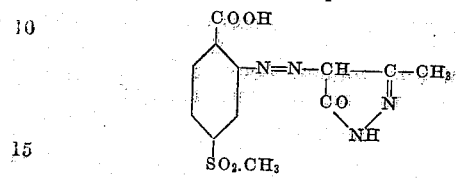

21.5 parts of 2-amino-benzoic acid-4-methylsulfone are dissolved in 100 parts of water with 6 parts of anhydrous soda. A solution of 6.9 parts of sodium nitrite is added, the whole cooled to 5° and then stirred into a mixture of 30 parts conc. hydrochloric acid, 100 parts water and 30 parts ice. Next sodium bicarbonate is added until the reaction is faintly blue to Congo paper and the diazonium solution poured into a solution of 10.2 parts of 3-methyl-5-pyazolone and 25 parts of anhydrous soda in 200 parts of water. After coupling is complete, the dyestuff is isolated by adding common salt, stirred with 300 parts of water and boiled for 2-3 hours with 200 parts of ammonium chromo-salicylate (corresponding to 7.6 parts of chromic oxide). Next the dark yellow solution is evaporated to dryness. The dyestuff so obtained is a clay coloured powder which dyes wool in very level yellow, light-fast shades from a bath made acid with organic acids.

2-amino-benzoic acid-4-methylsulfone can be prepared as follows: 1-methylbenzene-4-methylsulfone (Otto, B. 18, 161, (1885)) is nitrated to 2-nitro-1-methylbenzene-4-methylsulfone (M. Pt. 118–119° recrystallised from glacial acetic acid), the nitro compound is oxidised with potassium permanganate to 2-nitro-benzoic acid-4-methylsulfone (M. Pt. 210–211°, recrystallised from water) which is then reduced by the usual methods, e. g., with iron filings and acetic acid in water. (M. Pt. 243°, recrystallised from water.)

*Example 3*

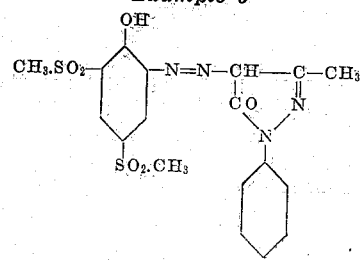

26.5 parts of 2-amino-1-hydroxybenzene-4:6-di-methylsulfone are dissolved in 150 parts of hot water with 6 parts of anhydrous soda. The solution is cooled to 0°, 30 parts of concentrated hydrochloric acid are added and diazotisation carried out as usual. A suspension of yellow crystals is obtained. The excess hydrochloric acid is neutralised by adding sodium bicarbonate and the mixture is poured at 5° into a solution of 18.4 parts of 1-phenyl-3-methyl-5-pyrazolone and 20 parts anhydrous soda in 200 parts of water. After formation of the dyestuff is complete it is salted out and separated by filtration. It is then pasted up with 500 parts of water, 200 parts of a solution of ammonium chromo-salicylate (corresponding to 7.6 parts chromic oxide) added and the whole heated to boiling for a few hours.

An orange solution is obtained containing a partly separated crystalline chromium complex. The separation of the latter is made complete by adding common salt. After filtering and drying, a brownish-orange powder is obtained which dyes wool from a bath made acid with formic acid in full orange shades which are very uniform and fast to light.

The new diazo component can be prepared as follows: 1-hydroxybenzene-4:6-di-methylsulfone (Heppenstall and Smiles, Journal Chem. Soc. 1904 (1938)) is nitrated and then reduced.

*Example 4*

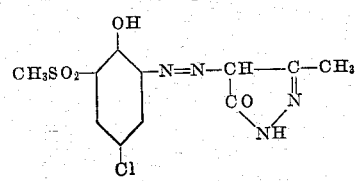

22.2 parts of 4-chloro-2-amino-1-hydroxybenzene-6-methylsulfone are stirred with 25 parts of concentrated hydrochloric acid in 150 parts of hot water, cooled to 0–3° and then diazotised with 6.9 parts of sodium nitrate in 20 parts of water. After completed diazotisation the reaction mixture is neutralised with sodium bicarbonate and the suspension of the diazonium compound is poured into a solution cooled to 0° of 10.2 parts of 3-methyl-5-pyrazolone and 12 parts anhydrous soda in 100 parts water. Stirring is continued at 3–5° until dyestuff formation is complete, then, after warming to 80° and allowing to cool, the precipitated, crystalline dyestuff is filtered off. It is chromed by stirring for a few hours in 500 parts of water with 200 parts of ammonium chromo-salicylate (corresponding to 7.6 parts of chromium oxide) and the chromium-containing dyestuff is then separated from the orange solution which develops by adding common salt. After filtering off and drying, the dyestuff is an orange powder dyeing wool from a bath containing 2–4% formic acid in pure, orange-red shades which are very fast to light. The dyeings have very good wet-fastness properties and are very level.

4-chloro-2-amino-1-hydroxybenzene-6-methylsulfone can be made as follows: 1:4-dichlorobenzene-2-methylsulfone is heated for a few hours at 180–190° with 2 mol of 5% caustic potash lye; the 4-chloro-1-hydroxybenzene-6-methylsulfone so obtained is nitrated to 4-chloro-2-nitro-1-hydroxybenzene-6-methylsulfone which is reduced with sodium sulfide.

*Example 5*

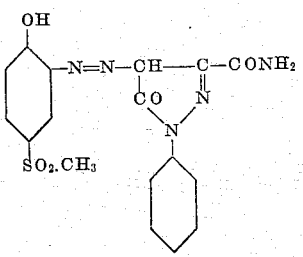

40.1 parts of the dyestuff obtained in the same manner as described in Example 4, by diazotising 18.7 parts of 2-amino-1-hydroxybenzene-4-methylsulfone and coupling with 21.5 parts of 1-phenyl-3-carboxylic acid amide-5-pyrazolone are heated for some hours to boiling in 650 parts of water with 200 parts of a solution of ammonium chromo-salicylate (corresponding to 7.6 parts of chromic oxide). A brownish-red solution results out of which part of the chromium complex separates as a black precipitate. While the reaction mixture is still hot, 25% of its volume of common salt is added. After cooling, the precipitated complex is filtered off and dried. A red powder is obtained. To increase solubility it is mixed with 15% of its weight of sodium pyrophosphate and 10% of a guanamine-sulfonic acid with a high-molecular alkyl radical (see Brit. Pat. No. 561,548). The dyestuff dissolves readily in hot water. It dyes wool from a bath made acid with acetic or formic acid in clear, scarlet red shades which are very fast to light. The dyeings are also distinguished by a high degree of evenness and by good wet fastness properties.

If instead of the above dyestuff there is used 35.9 parts of the dyestuff from 2-amino-1-hydroxybenzene-4-methylsulfone→2:4-dihydroxyquinoline, having the formula

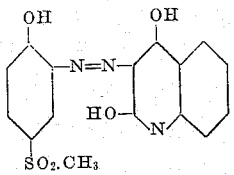

then a chromium complex is obtained which dyes wool in somewhat duller and bluer shades of red. However, these dyeings have still better wet-fastness properties.

*Example 6*

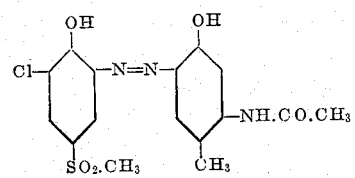

22.2 parts of 6-chloro-2-amino-1-hydroxybenzene-4-methylsulfone are dissolved in 200 parts of hot water with 18 parts of concentrated hydrochloric acid, cooled to 5° and diazotised with 6.9 parts of sodium nitrite in 20 parts of water. The diazonium compound precipitates out in the form of minute yellow crystals. Sodium bicarbonate is added until the reaction to Congo paper is neutral and the whole is then poured into a solution of 17.3 parts of 1-hydroxy-3-acetyl-amino-4-methylbenzene, 12 parts of anhydrous soda, 4.8 parts sodium hydroxide and 15 parts of pyridine in 100 parts of water. The reaction mixture is stirred for 12 hours at 0–3° and 24 hours at 20°, then warmed to 70° and common salt added. The dyestuff precipitates out in powder form and is filtered off hot. For conversion to the chromium complex it is stirred for a few hours, while boiling, with a solution of 550 parts of ammonium chromo-salicylate (corresponding to 7.6 parts of chromic oxide) and the chromed dyestuff then separated by adding common salt. On separation the chromed dyestuff is a reddish-brown powder, whose solubility may with advantage be increased by mixing in sodium pyrophosphate. From a bath made acid with acetic or formic acid it dyes wool in reddish-brown shades which are very even and fast to light. The dyeings exhibit particularly good penetration.

6-chloro-2-amino-1-hydroxybenzene-4-methylsulfone can be made as follows: 1:2-dichlorobenzene-4-methylsulfone (C. 1939 I, 250) is heated at 180–190° with 10% caustic soda lye, forming 1-hydroxy-2-chlorobenzene-4-methylsulfone which is then nitrated and reduced.

Example 7

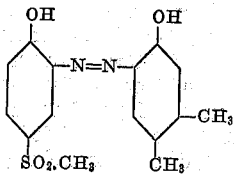

18.7 parts of 2-amino-1-hydroxybenzene-4-methylsulfone are diazotised and coupled, after neutralisation with sodium bicarbonate, at 20° with a solution of 12.8 parts of 3:4-dimethyl-1-hydroxybenzene together with 15 parts of anhydrous soda, 4.2 parts of sodium hydroxide (as a 30% solution) and 20 parts of pyridine in 200 parts of water. The dyestuff, which precipitates almost completely, is filtered off, pasted up with 600 parts of water and then boiled under reflux for 5 hours with 200 parts of a solution of ammonium chromo-salicylate (corresponding to 7.6 parts of chromic oxide). Next the complex is salted out with 210 parts of common salt, filtered off after cooling, dried and mixed with 17 parts of sodium pyrophosphate. The new dyestuff, which is a brown powder, dyes wool from an acid bath (organic acid) in full red-brown shades of good evenness and possessing very good wet-fastness properties as well as good fastness to light.

A similar complex compound is obtained if the azo dyestuff is heated to boiling with 100 parts of potassium chromite-glycerol solution (see, e. g., British Pat. 186,635), corresponding to 7 parts of chromic oxide, for a few hours and the chromed dyestuff filtered off, after first diluting with water.

If the 2-amino-1-hydroxybenzene-4-methylsulfone in the above example is replaced by 22.2 parts of 6-chloro-2-amino-1-hydroxybenzene-4-methylsulfone, then a browner, duller dyestuff which otherwise has similar properties is obtained.

Example 8

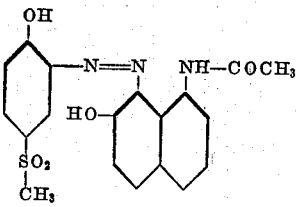

40 parts of the dyestuff obtained by coupling 18.7 parts of diazotised 2-amino-1-hydroxybenzene-4-methylsulfone with 21.1 parts of 1-acetylamino-7-hydroxynaphthalene are heated to boiling under reflux in 500 parts of water with 200 parts of a solution of ammonium oxalato-aminochromate (corresponding to 7.6 parts of chromic oxide) until formation of the complex is finished. The complex separates out to a large extent during refluxing and is filtered off and dried. It is a grey powder which readily dissolves in water when mixed with sodium pyrophosphate. It dyes wool from the neutral or weakly acid bath in very even grey shades with very good fastness to light and good wet-fastness properties. If 44.5 parts of the dyestuff from 23.2 parts of diazotised 5-nitro-2-amino-1-hydroxy-benzene-4-methylsulfone and 21.1 parts of 1-acetylamino-7-naphthol are used instead of the above dyestuff there is produced a dyestuff of the formula:

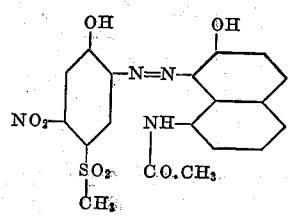

which is even more suitable for dyeing wool from a neutral bath, but whose solubility is lower. The dyeings are somewhat greener and faster under wet conditions, but a little less fast to light.

Ammonium-oxalato-ammino-chromate solution is prepared as follows: 18.9 parts of oxalic acid crystals ($C_2H_2O_4 \cdot 2H_2O$) are dissolved at 90° in 130 parts of chromic fluoride solution (corresponding to 7.6 parts of chromic oxide). Next 27.2 parts of 21.4% ammonia are allowed to flow in slowly under the surface of the solution over a period of 25 minutes. An apple-green solution forms which is diluted to 200 parts with water.

5-nitro-2-amino-1-hydroxybenzene-4-methylsulfone is prepared as follows: 1-hydroxy-2-aminobenzene-4-methyl-sulfone is converted to the corresponding benzoxazolone-methyl-sulfone (M. Pt. 218–220°, recrystallised from water) by treatment with phosgene in an alkaline medium. This compound is nitrated to nitro-benzoxazolone-methylsulfone (M. Pt. 265–267°, recrystallised from water) which is hydrolysed to give the desired product by treatment with warm, dilute caustic soda solution. The product, recrystallised from water, has a M. Pt. of 236° (decomposition occurs on melting).

Example 9

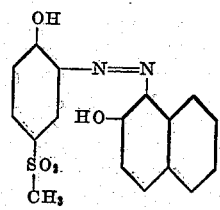

34.1 parts of the dyestuff obtained by coupling 18.7 parts of diazotised 2-amino-1-hydroxybenzene-4-methyl-sulfone with 15.1 parts of 2-hydroxynaphthalene are chromed in the manner described in Example 7. After chroming is complete, separation of the dyestuff, which has already commenced is completed by the addition of common salt. The precipitated dyestuff is filtered off and dried and the violet-brown powder so obtained is mixed with sodium pyrophosphate and with a guanamine sulfonic acid containing a high molecular alkyl residue (see Brit. Patent 561,548) to increase the solubility and levelling power of the dyestuff. It dyes wool and nylon from a neutral bath in level, brownish-violet shades of outstanding fastness to light. The wool dyeings have also very good fastness properties towards laundering, stoving and alkaline treatment.

A dyestuff with similar properties is obtained when a corresponding amount of the dyestuff from 20.1 or 21.5 parts of 2-amino-1-methoxy (or -ethoxy)-benzene-4-methylsulfone respectively, and 15.1 parts of 2-hydroxynaphthalene, which dyestuff has the formula

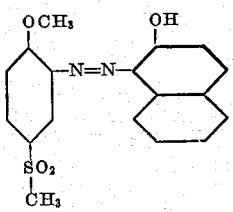

are heated in an autoclave for 10 hours with 600 parts of alcohol and 160 parts of aqueous chromium formate solution (corresponding to 8 parts of chromic oxide) containing 25 parts of 85% formic acid. The alcohol is then distilled off, the residue stirred up with water, filtered, dried and mixed with sodium pyrophosphate or anhydrous soda.

2'-amino-1-methoxy- (or -ethoxy)-benzene-4-methylsulfone can be prepared as follows: 1-chloro-2-nitrobenzene-4-methylsulfone is heated in benzene or chlorobenzene with an equivalent amount of sodium methylate or ethylate in methyl alcohol or ethyl alcohol until the chlorine atom has been exchanged for the alkoxy group. The 1-methoxy-2-nitrobenzene-4-methylsulfone (M. Pt. 147–148°) or the corresponding ethoxy compound (M. Pt. 135°) so obtained is then reduced.

*Example 10*

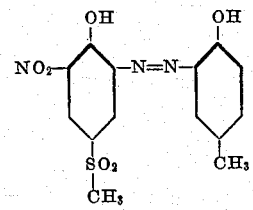

23.2 parts of 6-nitro-2-amino-1-hydroxybenzene-4-methylsulfone are dissolved in 150 parts of water with 15 parts by volume of 10 N caustic soda lye. To this solution is added a solution of 6.9 parts of sodium nitrite in 15 parts of water, and the mixture is then allowed to flow into 100 parts of water, 20 parts ice and 30 parts concentrated hydrochloric acid. After completion of diazotisation the reaction mixture is neutralised with sodium bicarbonate and the orange suspension of the diazonium compound is poured at 0.5° into a solution of 11.3 parts of 4-methyl-phenol, 30 parts of pyridine, 15 parts of anhydrous soda and 4.2 parts of sodium hydroxide in 300 parts water. Stirring is continued, while cooling with ice, until coupling is complete then, after warming to 70°, the dyestuff is precipitated by the addition of common salt, filtered off and washed with 20% brine. While still wet the dyestuff is stirred up with 1000 parts of water, 200 parts of a solution of ammonium-oxalato-ammino-chromate, are added (corresponding to 7.6 parts of chromic oxide) and the whole heated to boiling for 48 hours. A brownish-black, finely crystalline precipitate forms which is filtered hot, washed with cold water, dried and then mixed with sodium pyrophosphate and a dispersing agent as described hereinbefore. The new chromium-containing dyestuff which is a brown powder, dyes wool from the neutral or weakly acid (acetic acid) bath in brown shades which are fast to milling, laundering and sea-water. Non-homogeneous mixtures of loose wool are dyed very uniformly.

If this dyestuff is chromed with sodium chromite by methods known per se, then a complex compound is produced which dyes wool considerably redder. If ammonium chromo-salicylate is used, then the dyestuff formed gives dyeings which are somewhat greener and whose fastness to light is somewhat less.

6-nitro-2-amino-1-hydroxybenzene-4-methylsulfone is made as follows: 1-hydroxy-2-amino-benzene-4-methylsulfone is dissolved in sulfuric acid and then nitrated at 0° with a mixture of equal parts of nitric and sulfuric acids. Melting point, recrystallised from acetic acid, 204–206°.

*Example 11*

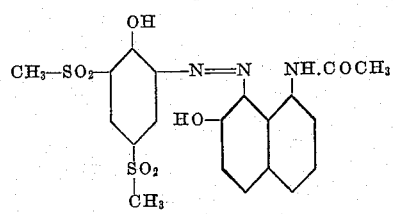

The dyestuff obtained by coupling 26.5 parts of diazotised 2-amino-1-hydroxybenzene-4.6-dimethylsulfone with 21.2 parts of 1-acetylamino-7-hydroxynaphthalene in a medium made alkaline with soda is pasted up with 1000 parts of water; 200 parts of a solution of ammonium chromo-salicylate (corresponding to 7.6 parts of chromic oxide) are added and the whole heated to boiling for a few hours. The clear, dark violet-blue solution is allowed to cool and then common salt is added until the chromium-containing dyestuff has separated. It is then filtered off and dried. The new chromium-containing dyestuff is a grey powder which dyes wool from an acid bath (organic acid) in full, grey shades having a good colour in artificial light. The dyeing are outstandingly level and are very fast to laundering and to sea-water.

If ammonium chromo-salicylate in the above example is replaced by a solution of ammonium-axalato-ammino-chromate then the dyestuff obtained is excellently suited to dyeing wool in a neutral or weakly acid (acetic acid) bath.

*Example 12*

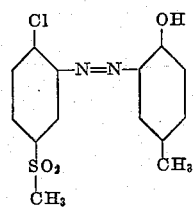

32.6 parts of the dyestuff obtained by coupling diazotised 1-chloro-2-aminobenezene-4-methylsulfone with 1-hydroxy-4-methylbenzene is pasted up with a solution of 16 parts of potassium hydroxide in 300 parts of water, freshly precipitated chromium hydroxde (corresponding to 10 parts of chromic oxide) in the form of a still moist paste is added and the whole heated in the autoclave for 6 hours at 135–140°. Next it is diluted with 1600 parts of water, common salt is added until the dyestuff separates completely, whereupon it is filtered off, dried and mixed with sodium pyrophosphate.

The chromium-containing dyestuff is a brown powder which dyes wool from a bath made acid with acetic or formic acid in full reddish-brown shades which are very uniform and fast to light.

Example 13

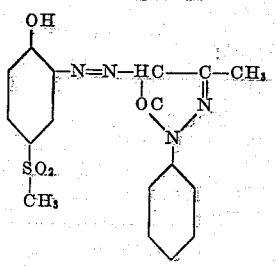

37.2 parts of the dyestuff obtained by coupling 18.7 parts of diazotised 2-amino-1-hydroxybenzene-4-methylsulfone with 18.3 parts of 1-phenyl-3-methyl-5-pyrazolone are chromed exactly as described in Example 3. The chromium-containing dyestuff separates during chroming in the form of fine crystals. It is filtered off, dried and mixed with sodium phosphate, soda or sodium pyrophosphate. It is an orange powder which dyes wool from the acid bath (acetic acid) in clear, orange, very uniform shades of very good fastness to light. The dyeings are very fast to laundering and sea-water.

Similar dyestuffs are obtained if instead of phenyl-methyl-pyrazolone there are used 21.9 parts of 1-(3'-chloro-phenyl)-3-methyl-5-pyrazolone or 19.8 parts of 1-(4'-methyl-phenyl)-3-methyl-5-pyrazolone.

The following table contains a list of further diazo and coupling components which can be used to produce chromium-containing dyestuffs according to the invention.

| No. | Diazo Component | Coupling Component | Colour of the Cr complex on Wool |
|---|---|---|---|
| 1 | 2-Amino-1-hydroxybenzene-4-methylsulfone | 3-methyl-5-pyrazolone | orange. |
| 2 | do | 1-hydroxy-3-acetylamino-4-methylbenzene | reddish brown. |
| 3 | do | 1-naphthol-5-methylsulfone | violet. |
| 4 | do | 2-naphthol-6-methylsulfone | reddish violet. |
| 5 | do | 1-(3'-methylsulfonyl)-phenyl-3-methyl-5-pyrazolone. | orange. |
| 5a | do | 1-carbomethoxyamino-7-hydroxy-naphthalene | greenish grey. |
| 6 | do | 1-(4'-methylsulfonyl)-phenyl-3-methyl-5-pyrazolone. | orange. |
| 7 | 4-nitro-2-amino-1-hydroxybenzene | do | Do. |
| 8 | 5-nitro-2-amino-1-hydroxybenzene | do | bluish red. |
| 9 | 5-nitro-2-amino-1-hydroxybenzene-4-methylsulfone | 3-methyl-5-pyrazolone | scarlet. |
| 10 | do | 1-phenyl-3-methyl-5-pyrazolone | Do. |
| 11 | do | 3:4-dimethyl-phenol | brownish violet. |
| 12 | 6-nitro-2-amino-1-hydroxybenzene-4-methylsulfone | do | brown. |
| 13 | do | 1-Hydroxy-3-acetylamino-4-methylbenzene | reddish brown. |
| 14 | do | 1-Hydroxy-2-acetylamino-4-methylbenzene | olive brown. |
| 15 | 4-nitro-2-amino-1-hydroxybenzene-6-methylsulfone | 1-Hydroxy-4-methylbenzene | brown. |
| 16 | do | 2-Hydroxynaphthalene | violet brown. |
| 17 | 2-amino-1-hydroxybenzene-4:6-bis-methylsulfone | do | Do. |
| 18 | 2-aminobenzoic acid-4-methylsulfone | do | brownish red. |
| 19 | do | 1-acetylamino-7-hydroxy-naphthalene | violet brown. |
| 20 | do | 1-phenyl-3-methyl-5-pyrazolone | reddish yellow. |

What I claim is:

1. The complex chromium compound of a monoazo dyestuff having the formula

[X—A—N=N—B]—(SO$_2$—CH$_3$)$_n$ wherein
A represents a benzene nucleus,
B represents the radical of a member selected from the group consisting of phenolic, naphtholic and enolic coupling components, and containing an OH group in o-position to the azo group,
X represents a metallizable group selected from the group consisting of OH and COOH, in o-position to the azo group, and
n is one of the integers 1 and 2, the methyl sulfone group being bound aromatically, and A and B being otherwise free from carboxylic acid and sulfonic acid groups.

2. The complex chromium compound of a monoazo dyestuff having the formula

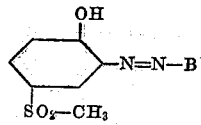

wherein
B represents the radical of a member selected from the group consisting of phenolic, naphtholic and enolic coupling components, containing an OH group in o-position to the azo group, and being free from carboxylic and sulfonic acid groups.

3. The complex chromium compound of a monoazo dyestuff having the formula

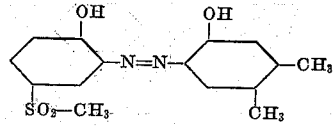

4. The complex chromium compound of a monoazo dyestuff having the formula

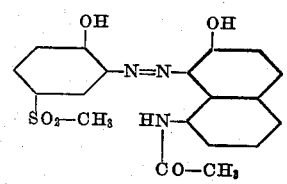

5. The complex chromium compound of a monoazo dyestuff having the formula

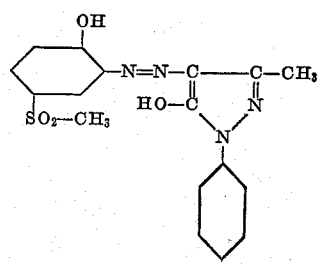

6. The complex chromium compound of a monoazo dyestuff having the formula

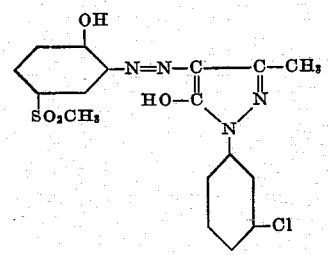

7. The complex chromium compound of a monoazo dyestuff having the formula

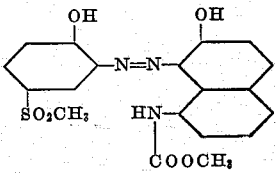

GUIDO SCHETTY.

REFERENCES CITED

The following references are of record in the file of this patent:

UNITED STATES PATENTS

| Number | Name | Date |
|---|---|---|
| 1,718,882 | Schwenk et al. | June 25, 1929 |
| 2,228,303 | Fischer | Jan. 14, 1941 |
| 2,391,180 | McNally et al. | Dec. 18, 1945 |
| 2,432,403 | Felix et al. | Dec. 9, 1947 |

OTHER REFERENCES

Sus: Ann. der Chem. V. 556 (1944) p. 65–80, 16 pages.